(12) United States Patent
Winter et al.

(10) Patent No.: US 7,920,481 B2
(45) Date of Patent: Apr. 5, 2011

(54) PATH MAXIMUM TRANSMISSION UNIT DETERMINATION

(75) Inventors: Robert L. Winter, Leander, TX (US); Narayanan Subramaniam, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 193 days.

(21) Appl. No.: 12/192,186

(22) Filed: Aug. 15, 2008

(65) Prior Publication Data

US 2009/0316574 A1 Dec. 24, 2009

(30) Foreign Application Priority Data

Jun. 23, 2008 (IN) .................................. 1494/2008

(51) Int. Cl.
*H04L 12/26* (2006.01)
(52) U.S. Cl. ......... 370/248; 370/252; 370/400; 709/233
(58) Field of Classification Search ........................ None
See application file for complete search history.

(56) References Cited

U.S. PATENT DOCUMENTS

| | | | |
|---|---|---|---|
| 2003/0185208 A1* | 10/2003 | Lee et al. ...................... | 370/389 |
| 2003/0188015 A1 | 10/2003 | Lee et al. | |
| 2004/0008664 A1 | 1/2004 | Takahashi et al. | |
| 2005/0041635 A1 | 2/2005 | Chung et al. | |
| 2005/0246570 A1* | 11/2005 | Block et al. ...................... | 714/4 |
| 2005/0281288 A1 | 12/2005 | Banerjee et al. | |
| 2008/0101237 A1* | 5/2008 | Ogura et al. .................. | 370/235 |
| 2008/0159150 A1* | 7/2008 | Ansari .......................... | 370/238 |

OTHER PUBLICATIONS

U.S. Appl. No. 11/970,516, filed Jan. 7, 2008.
U.S. Appl. No. 12/033,397, filed Feb. 19, 2008.
J. Mogul et al., "Request for Comments (RFC) 1191—Path MTU Discovery" Network Working Group, Nov. 1990, pp. 1-19.
J. McCann et al., "Request for Comments (RFC) 1981—Path MTU Discovery for IP Version 6" Network Working Group, Aug. 1996, pp. 1-15.
T. Narten et al., "Request for Comments (RFC) 2461—Neighbor Discovery for IP Version 6 (IPv6)" Network Working Group, Dec. 1998, pp. 1-95.
M. Mathis et al., "Request for Comments (RFC) 4821—Packetization Layer Path MTU Discovery" Network Working Group, Mar. 2007, pp. 1-34.

* cited by examiner

*Primary Examiner* — Seema S Rao
*Assistant Examiner* — Rhonda Murphy
(74) *Attorney, Agent, or Firm* — Larson Newman & Abel, LLP

(57) ABSTRACT

Disclosed are techniques for determining a path maximum transmission unit (MTU) of a communication path connecting two or more nodes of a network. A node initiates a connection with a remote node by repeatedly transmitting increasingly-larger path MTU discovery messages until the size of a path MTU discovery message exceeds the link MTU of a link within the communication path. This results in the generation and transmission of an MTU error message back to the initiating node. The edge router linked to the initiating node generates a MTU change message in response to receiving the MTU error message and multicasts the MTU change message to all local nodes to which it is linked. The MTU change message directs the receiving nodes to update their destination caches to reflect the path MTU discovered through the use of the increasing-size path MTU discovery messages and the resulting MTU error message.

14 Claims, 4 Drawing Sheets

PATH MAXIMUM TRANSMISSION UNIT DETERMINATION

CROSS REFERENCE TO RELATED APPLICATIONS

This application claims priority under 35 U.S.C. §119 to Indian Patent Application No. 1494/DEL/2008, entitled "PATH MAXIMUM TRANSMISSION UNIT DETERMINATION," filed on Jun. 23, 2008.

FIELD OF THE DISCLOSURE

This disclosure relates generally to information handling systems, and more particularly to path maximum transmission unit (MTU) for packet-switched data transmissions for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Information handling systems often make use of packet-switched networks, such as Internet Protocol (IP)-based networks, to transfer data. Typically, the data to be transmitted is segmented into a series of datagrams, or packets, of a fixed or variable size for transmission. However, many packet-switched networks utilize a series of separate links that connect two devices, and each link may be capable of a different maximum packet size (or maximum transmission unit (MTU)). Thus, a transmitting device typically employs a path MTU discovery process whereby a series of progressively-larger path MTU discovery messages are transmitted by the transmitting device until an error message is generated due to the path MTU discovery message exceeding the link MTU of a particular link in the communication path between the transmitting device and the receiving device. The transmitting device then identifies the size of this path MTU discovery message as the MTU for the communication path. In conventional systems, this path MTU discovery process is separately repeated by each transmitting device on the network or sub-network, thereby resulting in the use of a considerable portion of the network resources solely for the determination of the MTUs for the various paths between transmitting devices and receiving devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
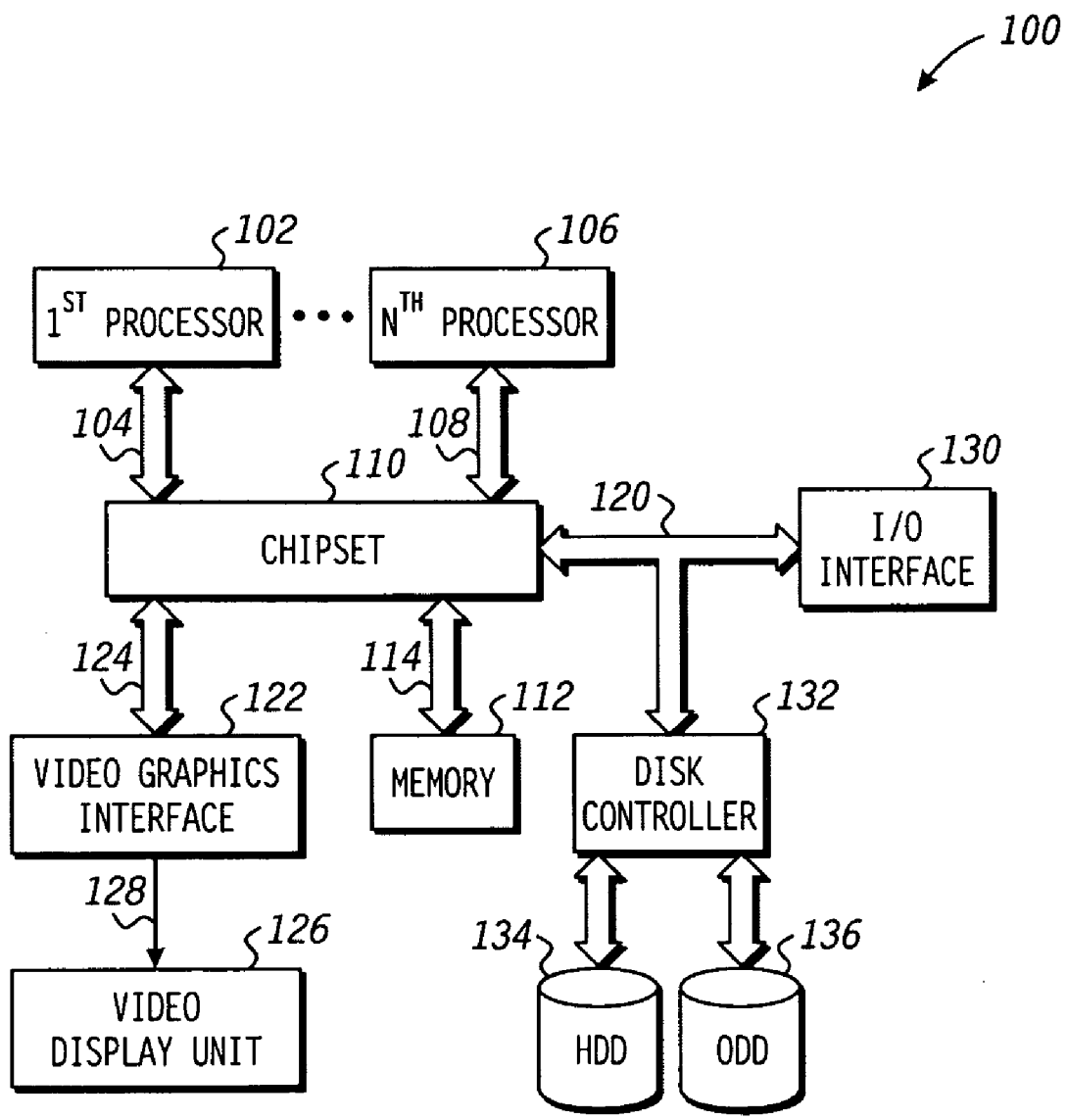
FIG. 1 is a block diagram illustrating an information handling device according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling device can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling device can be a personal computer, a PDA, a consumer electronic device, a network server or storage device, a switch router, wireless router, or other network communication device, or any other suitable device and can vary in size, shape, performance, functionality, and price. The information handling device can include memory, one or more processing resources such as a central processing unit (CPU) or hardware or software control logic. Additional components of the information handling device can include one or more storage devices, one or more communications ports for communicating with external devices as well as various input and output (I/O) devices, such as a keyboard, a mouse, and a video display. The information handling device can also include one or more buses operable to transmit communications between the various hardware components.

FIGS. 1-4 illustrate example networks and techniques for determining the path maximum transmission unit (MTU) (i.e., the maximum packet size) of a communication path connecting two or more nodes of a network. A node initiates a connection with a remote node by repeatedly transmitting increasingly-larger path MTU discovery messages until the size of a path MTU discovery message exceeds the link MTU of a link within the communication path. This situation results in the generation and transmission of an MTU error message back to the initiating node. In one embodiment, the edge router linked to the initiating node is configured to generate a MTU change message in response to receiving the MTU error message and then multicast the MTU change message to all local nodes to which it is linked. The MTU change message directs the receiving nodes to update their destination caches to reflect the path MTU discovered through the use of the increasing-size path MTU discovery messages and the resulting MTU error message. By multicasting the MTU change message to some or all of the nodes linked to the edge router so as to update each of these nodes with the same path MTU information, duplicative performance of the path MTU discovery process by each node individually can be avoided, thereby reducing unnecessary traffic on the network. Example techniques for updating the path MTU responsive to routing changes in the communication path and for periodically refreshing the path MTU are also disclosed.

For ease of illustration, the example techniques are described in the context of an Internet Protocol version 6 (IPv6)-based network utilizing path MTU discovery messaging substantially as described in the Internet Engineering Task Force (IETF) Request for Comments (RFC) 1981 specification and the IETF RFC 4821 specification and the neighbor discovery messaging described in the IETF RFC 2461 specification, which can be adapted as described below. However, the disclosed techniques are not limited to such configurations and instead may be implemented in any of a variety of packetized networks, particularly those that prevent or discourage packet fragmentation, without departing from the scope of the present disclosure. To illustrate, these techniques can be adapted for use in an IP version 4 (IPv4)-based network utilizing path MTU discovery messaging as described in the IETF RFC 1191 specification.

FIG. 1 illustrates an information handling device 100 in accordance with at least one embodiment of the present disclosure. In one form, the information handling device 100 can be a computer system such as a server. As shown in FIG. 1, the information handling device 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling device 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling device 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling device 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling device 100.

The information handling device 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Figure 2:
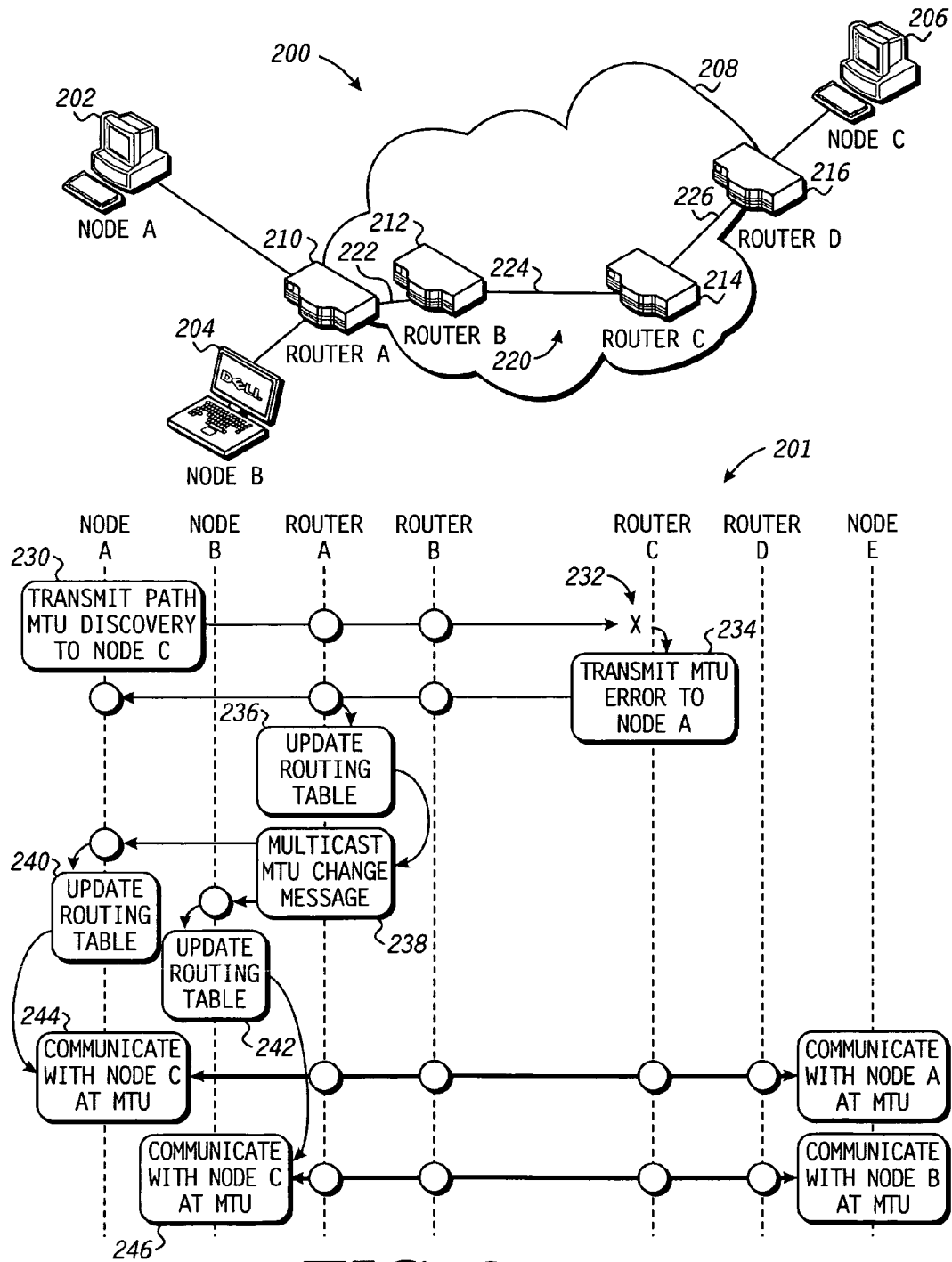
FIG. 2 is a diagram illustrating a network of a plurality of information handling devices and illustrating a flow chart representing a method for determining a path maximum transmission unit (MTU) between nodes of the network according to one aspect of the disclosure.

FIG. 2 illustrates a network 200 of a plurality of information handling devices and a flow chart 201 of its operation for determining the maximum transmission unit (MTU) of a communication path in accordance with at least one embodiment of the present disclosure. In the depicted example, the network 200 includes a plurality of local nodes, including nodes 202 and 204, and a remote node 206 (also identified as nodes A, B, and C, respectively), and a subnetwork (subnet) 208 comprising a plurality of linked routers, including routers 210, 212, 214, and 216 (also identified as routers A, B, C, and D, respectively). For ease of discussion, the nodes 202, 204, and 206 are illustrated and described as information handling devices at the edge of the network 200 (e.g., the ultimate sources and destinations of data transmitted via the network 200). However, in certain embodiments, one or more of the nodes 202, 204, and 206 can be implemented as routers of other subnetworks. To illustrate, node 202 and node 204 each can include an edge router in a separate subnetwork connected to the subnetwork 208 via the router 210, or the node 206 can include an edge router in a separate network connected to the subnetwork 208 via the router 216. For the description below, the network 200 is describe as based on the IPv6 standard and that nodes 202 and 204 are identified as being on the same local link (e.g., as identified via their link-local network addresses). Further, although three nodes are illustrated for ease of discussion, the techniques described herein can be applied to a network having any number of nodes without departing from the scope of the present disclosure.

The nodes 202, 204, and 206, and the routers 210, 212, 214, and 216 each can be implemented as an information handling device as illustrated in FIG. 1. In such instances, the particular functions and processes attributed to the various nodes and routers as described below can be performed by one or more of the processors of the information handling device 100 of FIG. 1 (e.g. processors 102 and 106 of FIG. 1). The one or more processors so configured can include hardware or firmware configured to perform some or all of the attributed functionality, some or all of the attributed functionality can be performed via software executed by the one or more processors, or a combination thereof. Each of the nodes 202, 204, and 206 includes a network interface to couple to a respective edge router of the subnet 208. To illustrate, the nodes 202 and 204 couple to the router 210 as the edge router for the nodes 202 and 204, and the node 206 is coupled to the router 216 as its edge router.

The routers 210, 212, 214, and 216 (collectively, "routers 210-216") include any of a variety of information handling devices configured to receive and transmit packetized data, including, but not limited to, routers, switches, bridges, etc. Each of the routers includes one or more network interfaces to couple to one or more other routers of the subnetwork 208, and, if the router is an edge router, a network interface to couple to one or more local nodes. In the depicted example, the routers 210-216 are connected so as to form a communication path 220 between the router 210 and the router 216 (and thus between node 202 and node 206 and between node 204 and node 206). The communication path 220 can be bidirectional (e.g., capable of communicating information from router 210 to router 216 and vice versa) or unidirectional (e.g., capable of communicating information only from router 210 to router 216). Although FIG. 2 depicts a single communication path formed by a series of four routers for ease of describing the techniques of the present disclosure, it will be appreciated that a typical subnet can have more than four routers to form a path between edges of the subnet 208, or that multiple possible communication paths between edge routers of a subnet may be present. The techniques of the present disclosure are equally applicable to such implementations, using the guidelines provided herein.

The communication path 220 includes a sequence of links between routers, including link 222 connecting router 210 and router 212, link 224 connecting router 212 and router 214, and link 226 connecting router 214 and 216. These links can be implemented as wired communications links, wireless communication links, or a combination thereof. In certain instances, the configurations, capabilities, and physical characteristics of the routers 210-216 and the communications links forming the links therebetween may differ such that different links may be capable of handling different packet sizes, or transmission units. For example, the link 222 may have a link MTU of X (e.g., 4 kilobytes), whereas the link 224 may be have a link MTU of only Y<X (e.g., 2 kilobyte). As a packet transmitted between the router 210 and the router 216 cannot exceed the minimum link MTU of the links 222, 224, and 226 (unless packet fragmentation is permitted), the communication path 220 has a path MTU equal to the minimum link MTU of these links.

The information handling devices of FIG. 2 (the nodes 202-206 and the routers 210-216) each can implement a separate destination cache (also referred to as a routing table) that directs the routing of packets within the network 200. The destination cache can be stored in, for example, the memory 112 (FIG. 1), a data cache (not shown), a register file (not shown), and the like. Typically, the destination cache for a particular information handling device of the network 200 includes an entry for each known destination device or destination prefix, the next device in the path to the destination (referred to as the "next hop"), and the path MTU for the path to that destination. To illustrate, an entry of the destination cache of the node 202 with respect to the node 206 could be described in Table 1:

TABLE 1

Destination Cache Entry for Node 202

| Destination | Next Hop | Path MTU |
| --- | --- | --- |
| Node 206 | Router 210 | X bytes |

Similarly, an entry of the destination cache of the router 210 with respect to the node 202 and node 206 could be described in Table 2:

TABLE 2

Destination Cache Entry for Router 210

| Destination | Next Hop | Path MTU |
| --- | --- | --- |
| Node 202 | * | X bytes |
| Node 206 | Router 212 | X bytes |

The destination caches of the other device of the network 200 can be similarly configured.

As described above, the IETF RFC 1981 specification describes a technique for determining the MTU of a communication path between a transmitting node and a receiving node by successively increasing the size of path MTU discovery messages transmitted between a transmitting node and a receiving node until the packet size of a path MTU discovery message exceeds the link MTU of a particular link in the communication path, thereby resulting in the transmission of an error message (e.g., a PacketTooBig message as specified by the Internet Control Message Protocol version 6 (ICMPv6)) back to the source node, which is then used by the source node to identify the path MTU. Once the path MTU was determined by the node, the node updated its destination cache to reflect the determined MTU. However, in conventional applications, the MTU for a given path determined by one node is not shared with any other nodes. As this information wasn't shared, the path MTU discovery process was repeated in its entirety by each node, even though certain nodes may share the same communication path (either as the entire communication path or as a link of a larger communication path). Thus, a considerable amount of effort is duplicated by each node, leading to a waste of network resources in transmitting the path MTU discovery messages and the resulting error messages.

Rather than repeating the same path MTU process for each node, in one embodiment the network 200 implements an improved technique whereby the path MTU discovery information can be shared between multiple nodes (e.g., those nodes on the same local link or associated with the same multicast address), thereby reducing or eliminating duplicate efforts by the individual nodes, and thereby freeing network resources for other processes. Flow chart 201 illustrates an example implementation of this path MTU discovery process as initiated by node 202. However, this same path MTU discovery process may be initiated in the same manner by node 204, or in the other direction by node 206.

At block 230, the node 202 initiates determination of the path MTU for the communication path 220 by attempting to transmit a sequence of path MTU discovery messages to node 206 via the subnet 208 (the size of each successive path MTU discovery message is larger than the previous) until the size of a path MTU discovery message exceeds the link MTU of a link in the communication path 220. In response to which, the router at the forward edge of the link generates an MTU error message and transmits the MTU error message back to the node 202. In the illustrated example, the link 226 linking router 214 and router 216 has the smallest MTU of the communication path 220, and thus when the router 214 receives a path MTU discovery message via routers 210 and 212 that exceeds the MTU of the link 226 (event 232), at block 234 the router 214 generates a MTU error message and transmits the MTU error message to the node 202 via the routers 212 and 210 to notify the node 202 that the size of the packet transmitted exceeds the capabilities of the link 226.

In at least one embodiment, the MTU error message includes a field having data representative of the link MTU of the link 226 in the forward direction from the router 214 to the router 216). For example, the MTU error message can comprise an IMCPv6 PacketTooBig message that includes the link MTU that was exceeded (e.g., by exceeding the link MTU of the link 226 in this example). To illustrate, the IETF RFC 1191 specification specifies that the router generating the PacketTooBig message include a value representative of the link MTU in the lower-order sixteen (16) bits of the header field of the PacketTooBig message, while setting the higher-order sixteen (16) bits to zero. The router 212 can generate the MTU error message as a PacketTooBig message in this manner. In other implementations, the MTU error message can include another standard message adapted to identify an MTU error and include data representative of the link MTU, or the MTU error message can include a custom-formatted message with this information.

In response to receiving the MTU error message in its transmission back to the node 202, at block 236 the router 210 accesses the field of the MTU error message having the link MTU of the forward link and updates its destination cache to update the path MTU for the communication path 220. To illustrate, if the MTU error message comprises an ICMPv6 PacketTooBig message in accordance with the IETF RFC 1191 specification, the router 210 can access the lower-order sixteen bits of the header field of the PacketTooBig message to obtain the data value representative of the link MTU. The non-edge router 212 also can update its destination cache in a similar manner upon receipt of the MTU error message.

In response to identifying that it is the edge router of the subnet 208 with respect to node 202 (e.g., by identifying that node 202 is the next hop) and further in response to receiving the MTU error message, at block 238 the router 210 generates an MTU change message that is multicast to any nodes on the same local link as the router 210 (nodes 202 and 204 in the illustrated example). The MTU error message can be multicast to the local nodes via, for example, a multicast address associated with the local nodes.

The MTU change message includes one or more fields that include data representative of the path MTU for the communication path 220 as determined by the router 210 at block 326 in response to receiving the MTU error message. To illustrate, the IETF RFC 2461 specification defines an ICMP Router Advertisement message that can be used by routers in an IPv6 network advertise their presence together with various link and Internet parameters either periodically, or in response to a Router Solicitation message. Conventionally, these Router Advertisements contain prefixes that are used for on-link determination and/or address configuration, a suggested hop limit value, etc. In one embodiment, the MTU change message can include an ICMP Router Advertisement message adapted to contain data representative of the determined path MTU for use by the receiving nodes. To illustrate, the ICMP Router Advertisement message semantics include an options field with a {type, length, value} triplet format, which may be adapted to provide the path MTU information, e.g., Type: 16 (Per Node MTU); Length: 128-bit prefix, 8-bit prefix length, 24-bit path MTU value; Length: 4 (as per RFC2461 specifications on the length notation of option fields).

In response to receiving the MTU change message, at block 240 the node 202 accesses the path MTU information from the appropriate field of the MTU change message and updates its destination cache to reflect the path MTU for the communication path 220 as indicated by the accessed path MTU information. Likewise, at block 242 the node 204 accesses the path MTU information from the MTU change message updates its destination cache to reflect the path MTU for the communication path 220 in response to receiving the MTU change message from the router 210. Based on this path MTU update, at block 244 the node 202 then can begin communicating data with the node 206 by packetizing the data in accordance with the updated path MTU indicated in its destination cache and at block 246 the node 204 can begin communicating data with the node 206 by packetizing the data in accordance with the updated path MTU indicated in its destination cache.

As described above, the edge router linked to the node initiating the path MTU discovery process (i.e., the router 210 in the example above) updates all of the local nodes to which it is linked with path MTU information via the MTU change message, thereby allowing multiple nodes to make use of the path MTU process initiated by one node, rather than requiring each node to separately conduct its own path MTU process. By eliminating the need for other nodes to conduct the same path MTU process, the overall traffic transmitted on the subnet 208 is decreased, thereby permitting network resources to be utilized for other processes, such as the transmission of information.

As an example, assume there are two edge routers having M end nodes and N end nodes, respectively, and the conventional path MTU discovery process requires P iterations of the transmission of a path MTU discovery message. Further assume that each of the M end nodes establishes IPv6 connections to each of the N end nodes. Under these circumstances, the number of path MTU discovery messages that would be transmitted in accordance with the conventional path MTU discovery process would be equal to M*N*P. If M=100, N=2, and P=2, there would be 400 path MTU discovery messages transmitted in the conventional path MTU discovery process. In contrast, the best case scenario for the improved path MTU discovery process described above would be P path MTU messages. If P=2, this best case scenario represents a 20,000% improvement over the conventional path MTU discovery process under these conditions. The worst case scenario for the improved path MTU discovery process described above would be (P−1)+(M*N). If M=100, N=2, and P=2 as assumed above, the total number of path MTU messages transmitted in this worst case scenario is 201 path MTU messages, which still represents a 50% improvement over the conventional path MTU discovery process.

Figure 3:
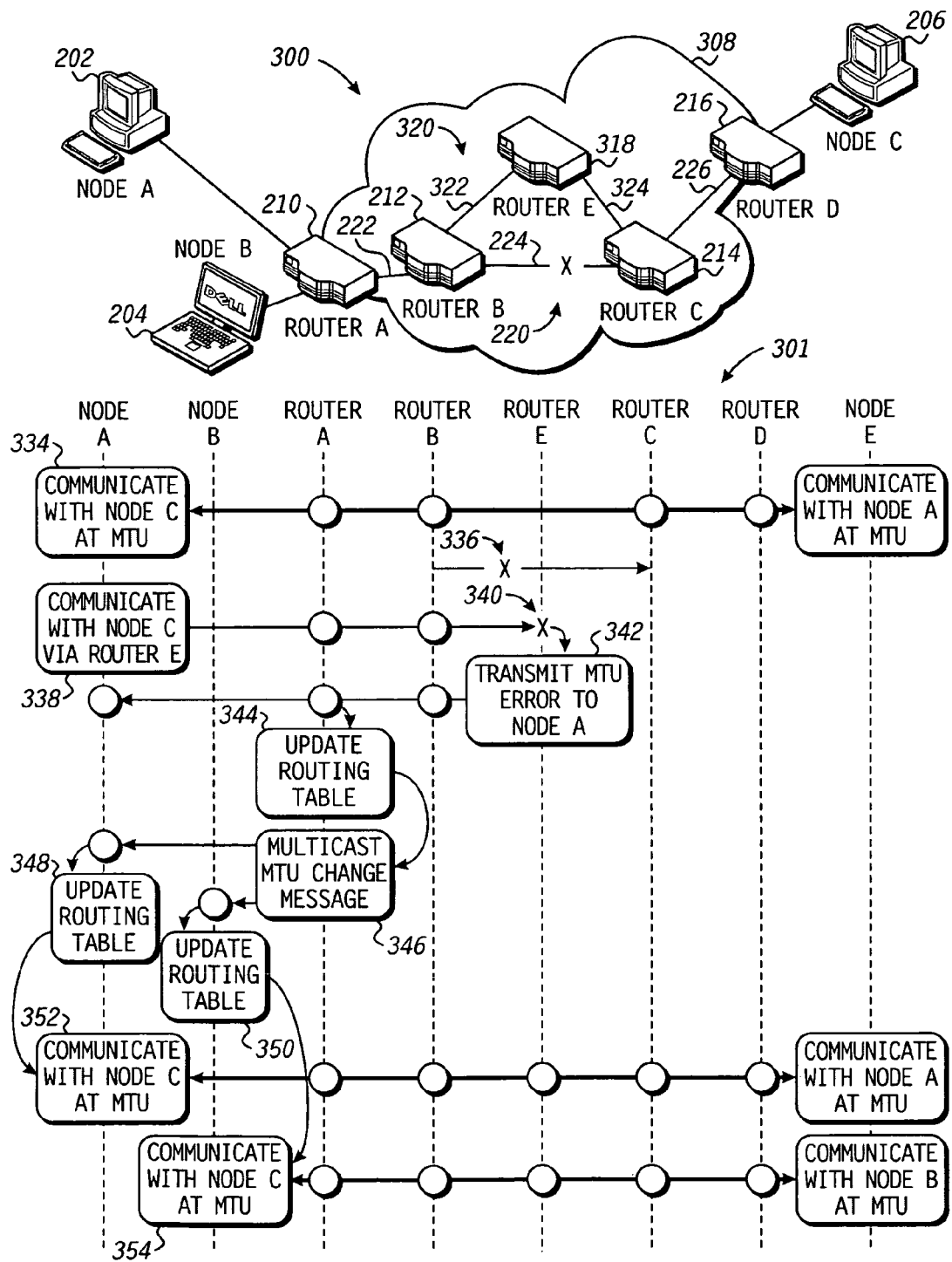
FIG. 3 is a diagram illustrating a network of a plurality of information handling devices and illustrating a flow chart representing a method for determining a path MTU between nodes of the network in response to a link failure according to one aspect of the disclosure.

FIG. 3 illustrates an additional aspect of the example path MTU process of FIG. 2 to accommodate for changes in the communication path between nodes in accordance with at least one embodiment of the present disclosure. In the depicted example, a network 300 (corresponding to the network 200 of FIG. 2) includes a plurality of nodes, including the nodes 202, 204, and 206 and a subnetwork (subnet) 308 (corresponding to subnet 208, FIG. 2) comprising a plurality of routers, including the routers 210, 212, 214, and 216 (also identified as routers A, B, C, and D, respectively) and another router 318 (also identified as router E). As discussed above, the routers 210-216 can be connected so as to form the communication path 220 between the router 210 and the router 216 via the links 222, 224, and 226 discussed above. Further, another communication path 320 is available between the router 210 and the router 216 via the link 222, a link 322 linking the router 212 to the router 318, a link 324 linking the router 318 to the router 214, and the link 226.

The node 202 (or alternately the node 204) can initiate the improved path MTU discovery process described above so that the node 202 and the node 204 are updated with the path MTU between the nodes 202, 204 and the node 206 on the basis of the path MTU of the communication path 220. However, in certain instances, one or more of the links of the communication path 220 may fail, temporarily or permanently. Accordingly, an alternate path, such as communication path 320, if available, will be implemented in place of the failed communication path for communicating information across the subnet 308. The flow chart 301 illustrates an example process for performing a path MTU discovery process in such instances. For the example of flow chart 301, it is assumed that the link 224 between the router 212 and the router 214 fails for any of a variety of reasons, such as physical link failures (e.g., optical fiber is cut), network interface failures, or routing tasks failing on a particular interface, etc.

At block 334, node 202 and node 206 communicate information via the communication path 220 of the subnet 308 based on the transmission of packets having a MTU not greater than the path MTU for the communication path 220 determined in accordance with the process of FIG. 2. At some point during communications, the link 224 between the router 220 and the router 214 fails (event 336), thereby preventing the transmission of packets via the entirety of the communication path 220. In response to the failure of link 224, the router 212 reconfigures its routing path to identify router 318 as its next hop in the path to node 206 and the router 318 configures its routing path to identify router 214 as its next hop in the path to node 206, thereby establishing the communication path 320 as the communication path between nodes 202, 204 and node 206 via the subnet 308. Accordingly, at block 338 the node 202 begins to communicate information to the node 206 via the communication path 320, including the router 318.

In this example, the link 322 between the router 212 and the router 318 has an MTU that is less than the path MTU of the communication path 220. Assuming the node 202 remains configured to use the path MTU of the communication path 220 as the size of the packets it is attempting to transmit to the node 206, the first packet received at the router 212 from the node 202 that exceeds the MTU of the link 322 (event 340) causes the router 212 to generate and transmit an MTU error message back to the node 202 at block 342, whereby the MTU error message can include a field having data representing the link MTU of the link 322.

In response to receiving the MTU error message, at block 344 the router 210 accesses the field of the MTU error message having the link MTU of the forward link and updates its destination cache to update the path MTU for the communication path 320. The router 212 also can update its destination cache in a similar manner upon receipt of the MTU error message. Further, in response to identifying that it is the edge router of the subnet 308 with respect to node 202 (e.g., by identifying that node 202 is the next hop), at block 346 the router 210 generates an MTU change message that is multicast to any local nodes on the same link as the router 210 (nodes 202 and 204 in the illustrated example of FIG. 3). As discussed above, the MTU change message can include one or more fields having data representative of the path MTU for the communication path 320 as determined by the router 210 in response to receiving the MTU error message.

In response to receiving the MTU change message, at block 348 the node 202 updates its destination cache to reflect the new path MTU for the communication path 320 as indicated by the MTU change message received from the router 212. Likewise, at block 350 the node 202 updates its destination cache to reflect the new path MTU for the communication path 320 in response to receiving the MTU change message from the router 210. Based on this path MTU update, at block 352 the node 202 then can begin communicating data with the node 206 by packetizing the data in accordance with the updated path MTU indicated in its destination cache and at blocks 354 the node 204 can begin communicating data with the node 206 by packetizing the data in accordance with the updated path MTU indicated in its destination cache.

As described above, the failure of one or more links in the communication path results in the use of an alternate communication path that may have a lower path MTU than the original communication path. Accordingly, if a packet having a size greater than the lower path MTU is transmitted along the alternate communication path, an MTU error message will be generated at the link having the lower link MTU, which can be used as the stimulus for the edge router linked to the node initiating the communication to update all of the local nodes with the newly determined path MTU, thereby eliminating the need for each local node to conduct a separate path MTU discovery process when the alternate communication path is brought into use.

Figure 4:
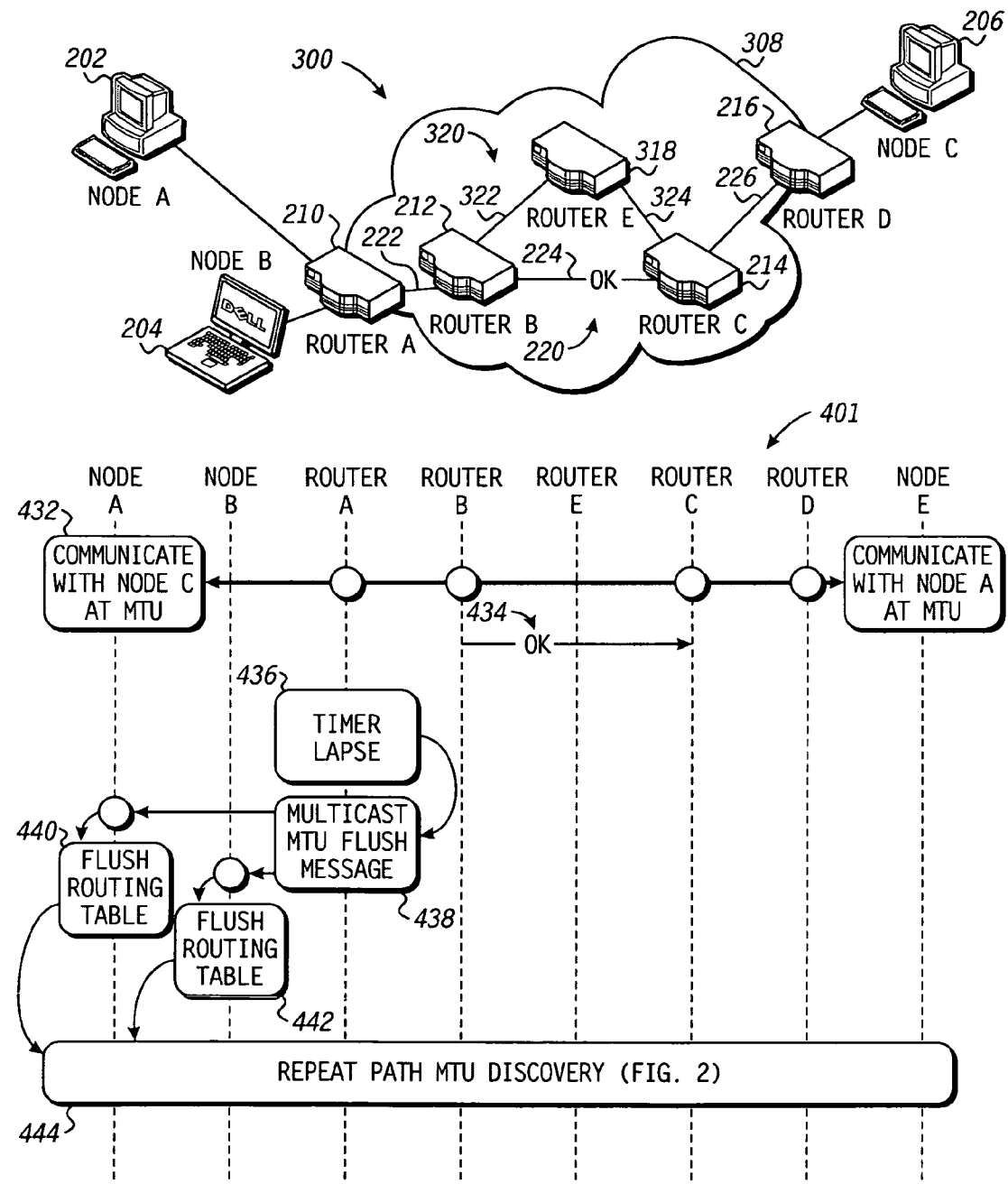
FIG. 4 is a diagram illustrating a network of a plurality of information handling devices and illustrating a flow chart representing a method for periodically updating a path MTU between nodes of the network in response to a link failure according to one aspect of the disclosure.

FIG. 4 illustrates an additional aspect of the example path MTU process of FIGS. 2 and 3 to accommodate for changes in the communication path between nodes of the network 300 in accordance with at least one embodiment of the present disclosure. As described above, one or more of the links of a communication path in the network 300 may temporarily fail and an alternate communication path, if available, can be implemented in place of the failed communication path for communicating information across the subnet 308. However, at some point the failed link may become reenabled and it may be desirable at that point to reinstate the original communication path. Moreover, the capabilities of a particular link, and thus the MTU of the link, may fluctuate over time. Depending on the degree of change in the link MTU relative to the other links in the communication path, the change in the link MTU of a particular link may have the effect of increasing or decreasing the path MTU of the communication path. It can advantageous to update the destination caches of the nodes utilizing the subnet 308 so as to reflect the fluctuations in the path MTU of the subnet 308, thereby allowing the nodes to utilize the largest packet size possible for the subnet 308 at any given time while avoiding the unnecessary generation and transmission of MTU error messages resulting from the transmission of packets having sizes in excess of the path MTU of the subnet 308 at that time. The flow chart 401 illustrates an example process for refreshing the path MTU discovery process for such instances. For the example of flow chart 401, it is assumed that the link 224 between the router 212 and the router 214 becomes reenabled at some point after failing as described above with reference to FIG. 3.

At blocks 432, node 202 and node 206 communicate information via the communication path 320 of the subnet 308 based on the transmission of packets having a MTU not greater than the path MTU for the communication path 320 determined in accordance with the process of FIG. 3. At some point during communications, the link 224 between the router 212 and the router 214 is reenabled (event 434), thereby allowing packets to be transmitted via the communication path 220. In this example, it is assumed that the communication path 220 is preferred over communication path 320. Thus, in response to the reenabling of link 224, the router 212 reconfigures its routing path to identify router 214 as its next hop in the path to node 206, thereby reestablishing the communication path 220 as the communication path between nodes 202, 204 and node 206 via the subnet 308. Accordingly, at block 338 the node 202 begins to communicate information to the node 206 via the communication path 220. However, in accordance with typical routing mechanisms, the node 206 may not yet have been made aware that the communication path of the subnet 208 has changed. Typically, the destination cache of the node 202 is populated such that the node 202 is configured to identify the router 210 as the next hop in the path to the destination (node 206) and thus the node 202 merely provides all packets to the router 210 for subsequent retransmission as the router 210 sees fit. Accordingly, the node 202 typically would initially continue to transmit packets having a size consistent with the path MTU of the communication path 320 even after the communication path 220 is reinstated in place of the communication path 320. Thus, if the communication path 220 has a greater path MTU than the communication path 320, the packets being transmitted from the node 202 are not taking full advantage of the efficiencies of the larger packet size available for transmission via the communication path 220.

Accordingly, in one embodiment the subnet 308 is configured to periodically refresh the path MTU for the subnet 308 so as to identify any potential increases in the MTU available via the communication path currently in use at the subnet 308. In one embodiment, the router 210, as the edge router to nodes 202 and 204, implements a timer set to periodically lapse (event 436), thereby triggering the router 210 at block 438 to generate a MTU flush message that is multicast to any local nodes on the same link as the router 210 (nodes 202 and 204 in the illustrated example of FIG. 4). In another embodiment, a different stimulus is used to occasionally trigger the generation of the MTU flush message. To illustrate, rather than using a timer, the router 210 instead can use a counter that counts a number of packets received at the router 210 and triggers once the count meets a threshold value. As another example, the router 210 can use the generation of a particular interrupt to trigger the generation of the MTU flush message.

The MTU flush message is intended to direct any receiving node to flush from the node's destination cache the path MTU associated with any destination (e.g., node 206) reached via the subnet 308. To illustrate, in one embodiment, the MTU flush message can include an ICMPv6 Router Advertisement message modified to include a path MTU value of 0 bytes, thereby signaling to the receiving nodes that the path MTU discovery process is to be reinitiated. Accordingly, at blocks 440 and 442 the nodes 202 and 204 each updates its destination cache to flush the path MTU associated with the subnet 308. With the path MTU for the communication path from the nodes 202, 204 to the node 206 being flushed with the destination caches of the nodes 202 and 204, at block 444 one of the nodes 202 or 204 can initiate the path MTU discovery process described above with respect to flow chart 201 of FIG. 2 so as to discover the current path MTU of the communication path currently implemented at the subnet 308.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. In a network comprising a plurality of nodes including a first node and a second node, a subnetwork comprising a plurality of linked routers, and a third node connected to the plurality of nodes via the subnetwork, a method comprising:

receiving, at a first router linked to the plurality of nodes, a first maximum transmission unit (MTU) error message from another router of the subnetwork, the first MTU error message including data representative of a first link MTU of a first link of the subnetwork that is in a first communication path between the plurality of nodes and the third node;

generating, at the first router, a first MTU change message in response to receiving the first MTU error message, the first MTU change message including data representative of the first link MTU;

transmitting, from the first router, the first MTU change message to the plurality of nodes;

establishing a second communication path between the plurality of nodes and the third node via the subnetwork in response to a failure of a link of the first communication path, the second communication path having a second link with a second link MTU that is lower than the first link MTU represented by the first MTU error message;

transmitting a data packet having a size equal to the first link MTU from the first node to the subnetwork;

transmitting, from a second router of the plurality of linked routers, a second MTU error message to the first router in response to determining at the second router that the size of the data packet exceeds the second link MTU, the second MTU error message including data representative of the second link MTU;

generating, at the first router, a second MTU change message in response to receiving the second MTU error message, the second MTU change message including data representative of the second link MTU; and transmitting, from the first router, the second MTU change message to the plurality of nodes.

2. The method of claim 1, further comprising:

receiving, at the first node, the first MTU change message;

storing a first path MTU to an entry of a destination cache of the first node based on the data representative of the first link MTU accessed from the first MTU change message, wherein the entry of the destination cache of the first node is associated with the third node;

receiving, at the second node, the first MTU change message; and storing the first path MTU to an entry of a destination cache of the second node based on the data representative of the first link MTU accessed from the first MTU change message, wherein the entry of the destination cache of the second node is associated with the third node.

3. The method of claim 2, further comprising:

packetizing, at the first node, data for transmission to the third node via the first communication path in accordance with the first path MTU in the destination cache of the first node; and packetizing, at the second node, data for transmission to the third node via the first communication path in accordance with the first path MTU of the destination cache of the second node.

4. The method of claim 1, further comprising:

transmitting, from the first node, a path MTU discovery message via the first communication path;

receiving, at a third router, the path MTU discovery message; and transmitting, from the third router, the first MTU error message to the first router in response to determining at the third router that a size of the path MTU discovery message exceeds the first link MTU.

5. The method of claim 1, further comprising:

receiving, at the first node, the second MTU change message;

storing a second path MTU to the entry of the destination cache of the first node based on the data representative of the second link MTU accessed from the second MTU change message;

receiving, at the second node, the second MTU change message; and storing the second path MTU to the entry of a destination cache of the second node based on the data representative of the second link MTU accessed from the second MTU change message.

6. The method of claim 5, further comprising:

packetizing, at the first node, data for transmission to the third node via the second communication path in accordance with the second path MTU in the destination cache of the first node; and packetizing, at the second node, data for transmission to the third node via the second communication path in accordance with the second path MTU of the destination cache of the second node.

7. The method of claim 1, further comprising:

generating, at the first router, a MTU flush message in response to a stimulus;

transmitting, from the first router, the MTU flush message to the plurality of nodes;

clearing a path MTU from an entry of a destination cache of the first node in response to receiving the MTU flush message at the first node, wherein the entry is associated with the third node;

clearing a path MTU from an entry of a destination cache of the second node in response to receiving the MTU flush message at the second node, wherein the entry is associated with the third node; and initiating, at the first node, a path MTU discovery process in response to clearing the path MTU from the entry of the destination cache of the first node.

8. The method of claim 7, wherein the stimulus comprises one selected from a group consisting of: a lapse of a timer at the first router; a receipt of a predetermined number of packets at the first router; and the generation of a predetermined interrupt at the first router.

9. The method of claim 1, wherein transmitting the first MTU change message to the plurality of nodes comprises multicasting the first MTU change message from the first router to the plurality of nodes.

10. The method of claim 1, wherein:

the first MTU error message comprises an Internet Control Message Protocol (ICMP) PacketTooBig message; and the first MTU change message comprises an ICMP Router Advertisement message.

11. A first router comprising:

a first network interface configured to be coupled to a plurality of nodes;

a second network interface configured to be coupled to a second router and to a third router of a subnetwork; and one or more processors configured to:

receive a first maximum transmission unit (MTU) error message from the second router, the first MTU error message including data representative of a first link MTU of a first link of the subnetwork that is in a first communication path between the plurality of nodes and a remote node;

generate a first MTU change message in response to receiving the first MTU error message, the first MTU change message including data representative of the first link MTU;

provide the first MTU change message to the first network interface for transmission to the plurality of nodes;

establish a second communication path between the plurality of nodes and the third node via the third router in response to a failure of a link of the first communication path, the second communication path having a second link with a second link MTU that is lower than the first link MTU represented by the first MTU error message;

transmit a data packet having a size equal to the first link MTU to the subnetwork;

receive, from the third router, a second MTU error message in response to determining at the third router that the size of the data packet exceeds the second link MTU, the second MTU error message including data representative of the second link MTU;

generate a second MTU change message in response to receiving the second MTU error message, the second MTU change message including data representative of the second link MTU; and provide the second MTU change message to the first network interface for transmission to the plurality of nodes.

12. The first router of claim 11, the one or more processors further configured to:

generate a MTU flush message in response to a stimulus; and provide the MTU flush message to the first network interface for transmission to the plurality of nodes in response to the stimulus.

13. The first router of claim 12, wherein the stimulus comprises one selected from a group consisting of: a lapse of a timer at the first router; a receipt of a predetermined number of packets at the first router; and the generation of a predetermined interrupt at the first router.

14. The first router of claim 11, wherein:
the first MTU error message comprises an Internet Control Message Protocol (ICMP) PacketTooBig message; and
the first MTU change message comprises an ICMP Router Advertisement message.

* * * * *